(No Model.)

R. M. HUNTER.
CONDUIT FOR ELECTRIC RAILWAYS.

No. 439,597. Patented Oct. 28, 1890.

Attest
Maurice H. Holmes.
S. T. Yerkes.

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

CONDUIT FOR ELECTRIC RAILWAYS.

SPECIFICATION forming part of Letters Patent No. 439,597, dated October 28, 1890.

Original application filed June 9, 1886, Serial No. 204,583. Divided and this application filed July 28, 1890. Serial No. 360,178.

(No model.)

*To all whom it may concern:*

Be it known that I, RUDOLPH M. HUNTER, of the city and county of Philadelphia, and State of Pennsylvania, have invented an Improvement in Conduits for Electric Railways, of which the following is a specification.

My invention has reference to conduits for electric railways; and it consists of certain improvements, which are fully set forth in the following specification and shown in the accompanying drawings, which form a part thereof.

This application (Case 157) is a division of my application Serial No. 204,583, filed June 9, 1886.

My improvement comprehends a conduit provided with a slot at its upper portion and a series of apertures at its lower part for drainage purposes. The conductor or conductors are supported within the conduit and insulated therefrom, and are preferably secured in place by means of suitable clamps, whereby they may be readily removable. The upper part of the conduit is provided with removable covers, which may be readily removed for the purpose of exposing the interior of the conduit and permitting ready access to the conductors. These covers are provided with laterally-extending portions formed with drainage-apertures for the purpose of permitting the escape of surface-water, so that it shall not pass into the slot of the conduit. The upper edges of the slot are somewhat higher than the drainage-apertures to offer a resistance to the passage of the water to the interior of the conduit. The foundations under the drainage-apertures of the covers are formed of broken stones or porous material, so that the water may readily pass off from the outside of the conduit. It is evident that this broken stone or porous foundation may also be arranged under the apertures at the lower part of the conduit.

Figure 1:
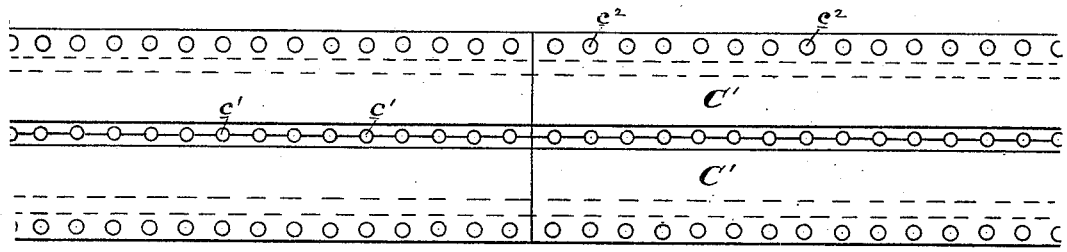
Figure 2:
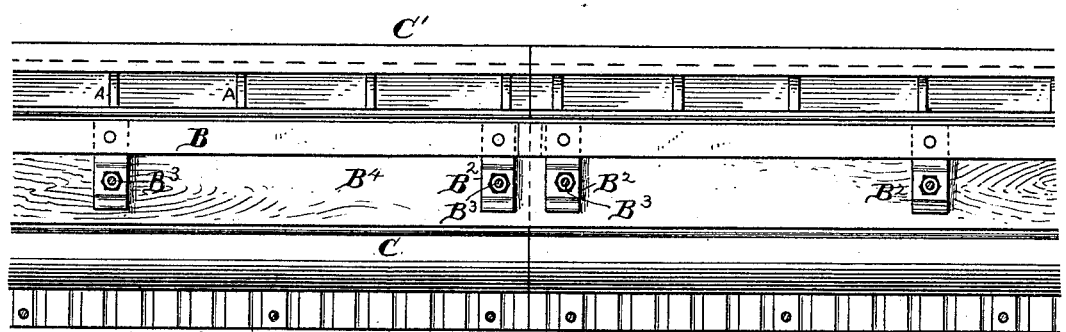
Figure 4:
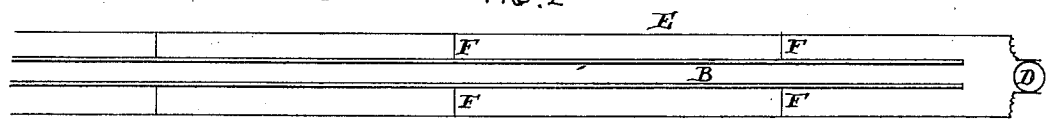
Figure 3:
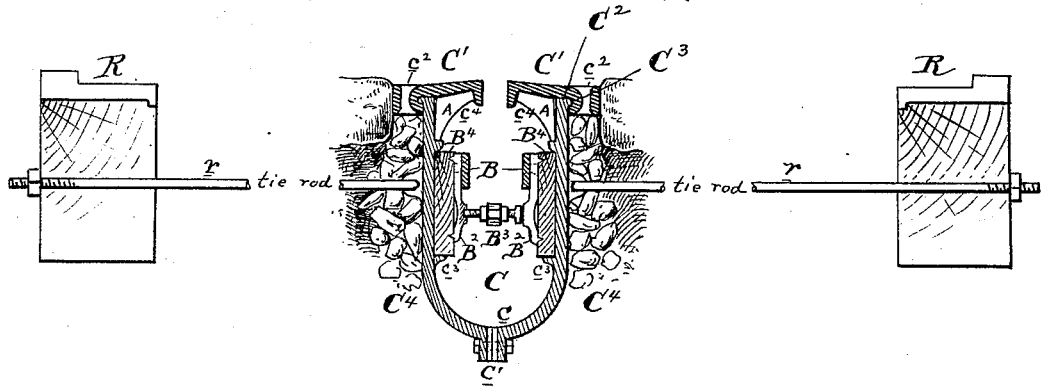

In the drawings, Figure 1 is a plan view of my improved conduit. Fig. 2 is a sectional elevation of same. Fig. 3 is a cross-section of same, and Fig. 4 is a diagram illustrating the electric circuits of the electric railways.

The conduit C is made U-shaped in cross-section, and is formed with two side parts united at their bottom, as indicated at $c$, the line of juncture being made with a series of drainage-holes $c'$, said holes being designed to allow any water within the conduit to gradually run off, leaving it in a dry condition. These drainage-holes may be used, if desired, in connection with cleaning-wells arranged at specified intervals apart; but such cleaning-wells do not form any part of this invention.

The top of the conduit may have covers or flanges removable or cast thereon; but I prefer to have these covers or flanges removable with respect to the body of the conduit, whereby they may be taken off for more readily exposing the interior. As shown, these covers $C'$ are made with sockets or jaws $C^2$, into or between which the upper edges of the conduit-walls fit. The said cover when in normal position hooks over the upper longitudinal ribs $C^3$ along the upper edge of the conduit-walls, and by this means the covers $C'$ are rigidly yet removably attached to the conduit and form a longitudinal slot in the upper portion thereof through which the current-collecting device of the electrically-propelled vehicle projects. The sides of the slot may be formed of depending drip-flanges $c^4$, extending down from the covers $C'$, whereby any water entering the slot will drip to the bottom of the conduit without reaching the conductors B, which latter are secured from or upon the walls thereof. The covers $C'$ are highest at their parts next to the slot, so as to cause the water in the roadway to run away from the slot and toward the outer edges of said covers or upper portions of the conduit. Exterior to the conduit these covers are provided with drainage-passages $c^2$, through which the surface-water is conducted to the ground upon the outside of the conduit. To facilitate this action, the foundation below the drainage-passages may be formed of loose stone $C^4$, or have any suitable means of connection with the sewer. The covers may be additionally supported by being provided with a series of internal ribs A upon their inner sides, which fit down upon the inside of the conduit-walls and rest upon longitudinal flanges. This will prevent any excessive strain which might come upon the edges adjacent to the slot from pressing in the covers.

The conductors B for supplying the electricity to the moving vehicle may be of any material of good electrical conductivity. These conductors are secured to brackets B², which are preferably provided with spurs, and are pressed in contact with and supported by longitudinal stringers or bars B⁴, of wood or other insulating material, which rest against the walls of the conduit, and, if desired, are supported upon projections c³. In place of long bars of wood short sections may be employed, which sections would be located under or back of each of the brackets. These brackets B² are pressed against the insulation B⁴ by means of any suitable insulating expanding devices B³, which are inserted between them. The devices shown consist of right and left hand screws with corresponding couplings or sockets arranged between them. By this means the conductors are removably attached to the insulating-walls within the conduit without the necessity of bolts or other device which are liable to make leakage contacts. With this construction it is easy to remove the worn or injured conductor-sections for repairs.

The working-conductors B are supplied with electric current from supply or line conductors E, which connect with the stationary source of electric power D. The supply or line conductors E may be arranged along the railway in any suitable manner. They may be supported upon poles or be buried in the earth, and are connected at intervals with the working-conductors by means of branch conductors F. The supply-conductors form no part of the working-circuit. The collectors of the vehicle make a traveling connection with the conductors B, located wholly within the conduit. It is evident that but a single conductor B may be arranged within the conduit, if desired.

The conduit is arranged either between or upon the outside of the rails R, and secured to the rails or their supporting-stringers by means of tie-bolts r, or in any other suitable manner. By this means the conduit is independent of the rails, and may be adjusted laterally with respect thereto, and can be taken up for repairs without interfering with the road-bed proper.

I do not limit myself to the details thereof, as they may be modified in various ways without departing from the spirit of my invention.

Having now described my invention, what I claim as new, and desire to secure by Letters Patent, is—

1. In an electric railway, a stationary source of electric supply, a bared electric working-conductor arranged along the railway, a separate supply-conductor electrically connected at intervals with said bared working-conductor, and a slotted conduit inclosing the working-conductor and forming no part of the electric circuit.

2. In an electric railway, the combination of a slotted conduit, two working-conductors located within the conduit and insulated therefrom, and removable covers for said conduit, which, when in position, form the sides of the slot.

3. In an electric railway, the combination of a slotted conduit, working-conductors arranged within the said conduit and insulated therefrom, removable covers for said conduit, which, when in position, form the sides of the slot, the said covers being provided with rigid jaws, which fit over the upper flanges of the conduit.

4. In an electric railway, the combination, of a slotted conduit, working-conductors in said conduit and insulated therefrom, removable covers for said conduit, which, when in position, form the sides of the slot, the said covers having rigid jaws which fit over the upper flanges of the conduit and form a lock between the said covers and conduit, whereby the weight of the covers retains them in a locked position.

5. A conduit for an electric railway having a longitudinal slot in its upper part and provided on one or both sides of the slot with depending dripping-flanges to prevent the water which enters the slot from running down the sides of the conduit.

6. A conduit for an electric railway having a longitudinal slot in its upper part and provided on one or both sides of the slot with depending dripping-flanges to prevent the water which enters the slot from running down the sides of the conduit, and one or more insulated working-conductors supported within the conduit and to one side of the dripping-flanges.

7. In an electric railway, the combination of a slotted conduit containing electric working-conductors with drainage-passages along the outer edges of the conduit to carry the water away before reaching the slot.

8. In an electric railway, the combination of a slotted conduit containing electric working-conductors provided with drainage-passages along the outer edges of the conduit to carry the water away before reaching the slot, and open or porous material located under said drainage-passages.

9. In an electric railway, a slotted conduit containing the bared working-conductors and having its top inclined so as to form a slot in the highest part thereof and provided with the drainage-passages upon the outer sides of the conduit to carry surplus water away from the slot.

10. In an electric railway, a slotted conduit containing electric working-conductors and provided with drainage-passages along the outer edges of the conduit to carry the water away before reaching the slot and in which said drainage-passages are formed through the top or cover of the conduit.

11. In an electric railway, a slotted conduit containing one or more bared working-conductors and having its lower part provided with a series of drainage-holes.

12. In an electric railway, a slotted conduit containing one or more bared working-conductors and formed in two halves united at the bottom and in which the lower part is provided with a series of drainge holes or openings through the line of juncture of the two halves of the conduit.

13. In an electric railway, the road-bed, in combination with the slotted conduit removable with respect to and independent of the rails, and one or more working-conductors contained within said conduit and insulated therefrom.

14. In an electric railway, the road-bed, in combination with the slotted conduit removable with respect to and independent of the rails, one or more working-conductors contained within the said conduit and insulated therefrom, and means to sustain the conduit in a fixed position with respect to the rails.

In testimony of which invention I have hereunto set my hand.

R. M. HUNTER.

Witnesses:
S. T. YERKES,
ERNEST HOWARD HUNTER.